United States Patent
Fukushima et al.

[11] Patent Number: 6,018,411
[45] Date of Patent: *Jan. 25, 2000

[54] OPTICAL DEVICE UTILIZING MAGNETO-OPTICAL EFFECT

[75] Inventors: Nobuhiro Fukushima; Hiroshi Onaka, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/859,256

[22] Filed: May 20, 1997

[30] Foreign Application Priority Data

Nov. 29, 1996 [JP] Japan .................................. 8-319777

[51] Int. Cl.⁷ ...................................................... G02F 1/09
[52] U.S. Cl. .......................... 359/283; 359/280; 359/281; 359/282; 359/284
[58] Field of Search .................................. 359/280, 281, 359/282, 283

[56] References Cited

U.S. PATENT DOCUMENTS

| | | | |
|---|---|---|---|
| 3,512,867 | 5/1970 | Pearson et al. | 359/281 |
| 3,675,125 | 7/1972 | Jaecklin | 359/281 |
| 3,707,321 | 12/1972 | Jaecklin et al. | 359/282 |
| 3,980,949 | 9/1976 | Feldtkeller | 359/282 |
| 4,239,337 | 12/1980 | Campbell et al. | 359/282 |
| 4,305,046 | 12/1981 | Le Floch et al. | 331/94.5 |
| 4,387,953 | 6/1983 | Shirasaki et al. | 350/96.14 |
| 4,548,478 | 10/1985 | Shirasaki | 350/377 |
| 4,581,579 | 4/1986 | Shirasaki | 324/244 |
| 4,609,257 | 9/1986 | Shirasaki | 350/376 |
| 4,637,027 | 1/1987 | Shirasaki et al. | 372/27 |
| 4,650,289 | 3/1987 | Kuwahara | 350/375 |
| 4,668,052 | 5/1987 | Shirasaki | 350/377 |
| 4,678,287 | 7/1987 | Buhrer | 350/404 |
| 4,818,881 | 4/1989 | Tanton et al. | 250/338.1 |
| 4,933,629 | 6/1990 | Kozuka et al. | 324/96 |
| 4,973,120 | 11/1990 | Jopson et al. | 350/96.13 |
| 4,984,875 | 1/1991 | Abe et al. | 350/377 |

(List continued on next page.)

FOREIGN PATENT DOCUMENTS

| | | |
|---|---|---|
| 56-94326 | 7/1981 | Japan . |
| 57-68818 | 4/1982 | Japan . |
| 57-94715 | 6/1982 | Japan . |
| 57-168221 | 10/1982 | Japan . |
| 57-188014 | 11/1982 | Japan . |
| 58-49916 | 3/1983 | Japan . |

(List continued on next page.)

OTHER PUBLICATIONS

Shirasaki et al., "Magnetooptical 2×2 switch for single-mode fibers," *Applied Optics*, vol. 23, No. 19, Oct. 1984, pp. 3271–3276.

(List continued on next page.)

*Primary Examiner*—Georgia Epps
*Assistant Examiner*—Margaret Burke
*Attorney, Agent, or Firm*—Staas & Halsey

[57] ABSTRACT

The present invention provides an optical device making use of a magneto-optical effect. The optical device comprises: a reflector for reflecting an input beam as a reflected beam; a magneto-optical crystal provided so as to pass the input and reflected beams; a first unit for applying a magnetic field to the magneto-optical crystal; and a second unit for varying the magnetic field in accordance with a control signal. The configuration described above allows a small magneto-optical crystal to be used and, thus, a small-size and a low-cost Faraday rotator to be provided. By adding a polarizer to such a Faraday rotator, a variable optical attenuator can be obtained. In particular, by employing a wedge plate as the polarizer, a polarized-independent optical attenuator can be provided.

42 Claims, 10 Drawing Sheets

U.S. PATENT DOCUMENTS

| | | | |
|---|---|---|---|
| 4,988,170 | 1/1991 | Buhrer | 350/377 |
| 5,029,953 | 7/1991 | Dexter et al. | 350/1.1 |
| 5,033,830 | 7/1991 | Jameson | 350/403 |
| 5,050,968 | 9/1991 | Ohara | 359/281 |
| 5,052,786 | 10/1991 | Schulz | 359/484 |
| 5,212,446 | 5/1993 | Itoh et al. | 324/244.1 |
| 5,267,078 | 11/1993 | Shiraishi et al. | 359/282 |
| 5,345,329 | 9/1994 | Shirai et al. | 359/282 |
| 5,477,376 | 12/1995 | Iwatsuka et al. | 359/281 |
| 5,521,741 | 5/1996 | Umezawa et al. | 359/246 |
| 5,528,415 | 6/1996 | Gauthier et al. | 359/282 |
| 5,889,609 | 3/1999 | Fukushima | 359/280 |

FOREIGN PATENT DOCUMENTS

| | | |
|---|---|---|
| 59-121313 | 7/1984 | Japan . |
| 59-121314 | 7/1984 | Japan . |
| 60-131523 | 7/1985 | Japan . |
| 60-200225 | 10/1985 | Japan . |
| 60-203914 | 10/1985 | Japan . |
| 60-165933 | 11/1985 | Japan . |
| 60-165934 | 11/1985 | Japan . |
| 60-222815 | 11/1985 | Japan . |
| 60-222818 | 11/1985 | Japan . |
| 61-97629 | 5/1986 | Japan . |
| 1-204021 | 8/1989 | Japan . |
| 2-83523 | 3/1990 | Japan . |
| 2-113019 | 9/1990 | Japan . |
| 6-51255 | 2/1994 | Japan . |

OTHER PUBLICATIONS

Sugaya et al., "Novel configuation for low–noise and wide–dynamic–range Er–doped fiber amplifierfor WDM systems," *OAA '95*, Paper FC3, Jun. 16, 1995 (Davos, Switzerland), 4 pages.

M. Shirasaki, et al., "Compact Optical Isolator for Fibers Using Birefringent Wedges"; Applied Optics, vol. 21, No. 23, pp. 4296–4299, (Dec. 1982).

OPTICAL DEVICE UTILIZING MAGNETO-OPTICAL EFFECT

BACKGROUND OF THE INVENTION

1. Field of the Invention

In general, the present invention relates to the downsizing of an optical device making use of a magneto-optical effect. In particular, the present invention relates to an optical device such as an optical attenuator using the Faraday rotation generated by a magneto-optical crystal.

2. Description of the Related Art

When a beam passes through a magneto-optical crystal such as YIG (Yttrium Iron Garnet) placed in a magnetic field, a Faraday-rotation angle caused by a magneto-optical effect is provided to the beam in accordance with the magnitude and direction of a magnetization vector of the magneto-optical crystal as well as the thickness of the magneto-optical crystal. An optical device based on this principle is called a Faraday rotator. A Faraday rotator is implemented by applying a magnetic field generated by a permanent magnet to a magneto-optical crystal. Since the magnitude and the direction of a magnetization vector applied to the magneto-optical crystal by the permanent magnet are fixed, the Faraday-rotation angle in the Faraday rotator also does not change as well.

There has been proposed a variable optical attenuator including a Faraday rotator wherein a magnetic field is applied to a magneto-optical crystal by only one electro-magnet as described in documents such as Japanese Patent Laid-open No. Hei1-204021. In case that only one electro-magnet is used, however, the magnetization of the magneto-optical crystal is not always saturated. When the magnetization of the magneto-optical crystal is not saturated, a number of magnetic domains are generated inside the magneto-optical crystal. The existence of such numerous magnetic domains causes the reproducibility of the attenuation effect of the optical attenuator to deteriorate and, even if satisfactory reproducibility can be preserved, a smooth change of the attenuation is difficult to produce. In addition, the existence of the numerous magnetic domains also gives rise to an attenuation effect in which light scattering in boundary surfaces among the magnetic domains is difficult to control.

Inventors of the present invention have proposed an optical device wherein the Faraday-rotation angle can be changed with the magnetization of the magneto-optical crystal saturated by the use of a combination of a permanent magnet and an electromagnet. For details, refer to OAA, FD9, pages 154 to 157, 1996 authored by Fukushima et al. This optical device is a variable optical attenuator which has a characteristic wherein, by varying a driving current to values in the range 0 to 40 mA, the attenuation can be changed smoothly within the range 1.6 to 25 dB.

The Faraday rotator with a variable Faraday-rotation angle like the one described above can be applied to devices such as a polarization controller for arbitrarily varying the polarization state and a variable optical attenuator. For example, provided at a practical scale with dimensions of 30 mm×25 mm×12 mm, the optical attenuator utilizing a permanent magnet and an electro-magnet described above can be incorporated in an optical repeater or other devices as it is. If the use of a number of optical attenuators is taken into consideration, however, more compact and lower-cost devices are in demand.

SUMMARY OF THE INVENTION

It is thus an object of the present invention to provide an optical device which can be made compact and manufactured at a low cost with ease. Other objects of the present invention will be understood from a study of the following description.

According to one aspect of the present invention, there is provided an optical device comprising: a reflector for generating a reflected beam by reflecting an input beam; a magneto-optical crystal provided so as to pass the input and reflected beams; a first means for applying a magnetic field to the magneto-optical crystal; and a second means for varying the magnetic field in accordance with a control signal.

Since the use of a reflector in the optical device provided by the present invention causes the magneto-optical crystal to work on both the input and reflected beams, the strength of the magnetic field or the thickness of the magneto-optical crystal for generating a certain Faraday-rotation angle can be essentially reduced by half. Because the price of a magneto-optical crystal is generally high, the reduction of the thickness of the magneto-optical crystal is an effective way of reducing the cost of the optical device. In addition, the reduction of the required strength of the magnetic field is an effective way of making the permanent magnet or the electro-magnet small for applying a magnetic field to the magneto-optical crystal or effective for reduction of the driving power of the electro-magnet.

The above and other objects, features and advantages of the present invention and the manner of realizing them will become more apparent and the present invention itself will be best understood from a study of the following description and appended claims with reference to attached drawings showing some preferred embodiments of the present invention.

BRIEF DESCRIPTION OF THE DRAWINGS

The present invention will be explained with reference to the following figures wherein.

DESCRIPTION OF THE PREFERRED EMBODIMENTS

Figure 1:
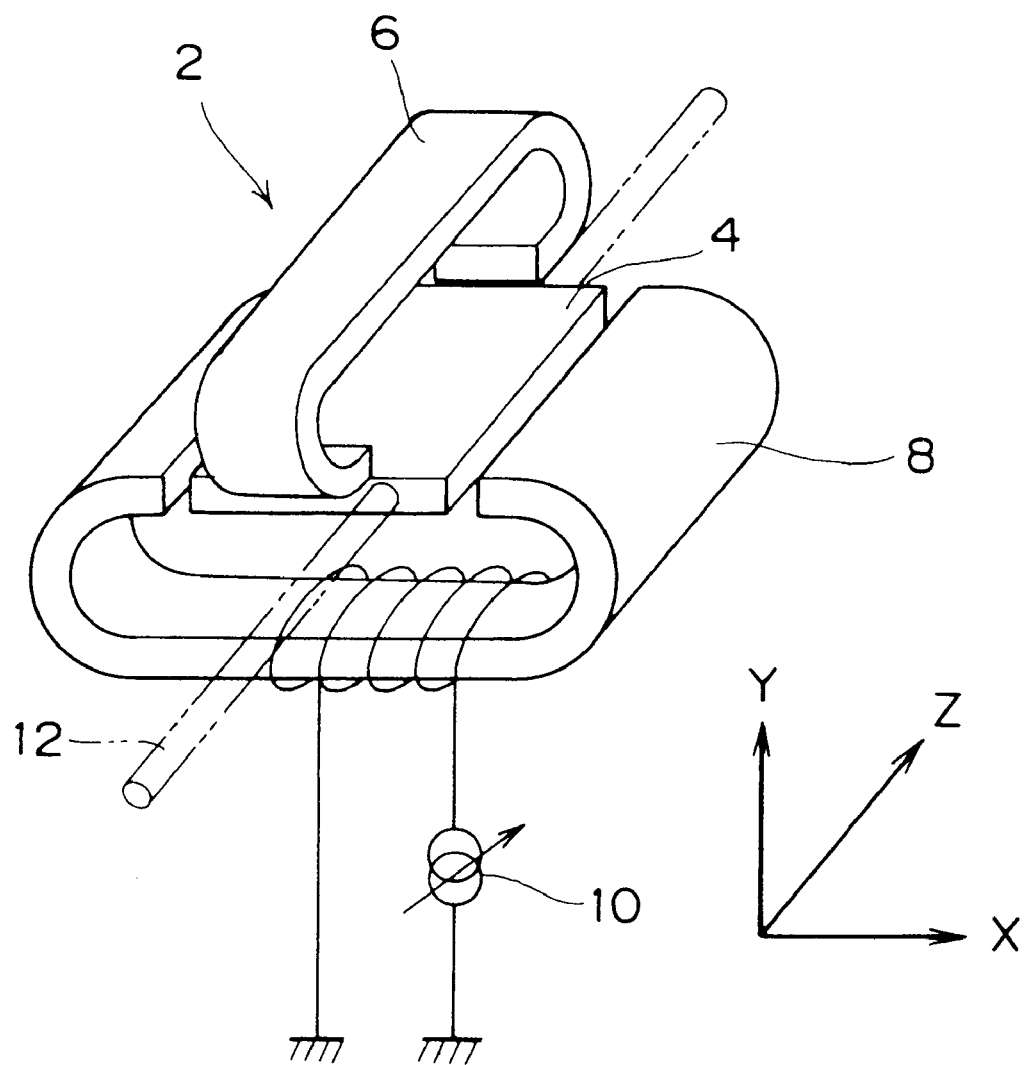
FIG. 1 is a diagram showing a squint view of a variable Faraday rotator provided by the conventional technology.

The present invention will become more apparent from a study of the following detailed description of preferred embodiments with reference to the accompanying diagrams showing th e embodiments. In the entire drawings, substantially like components are denoted by like reference numerals.

Figure 2:
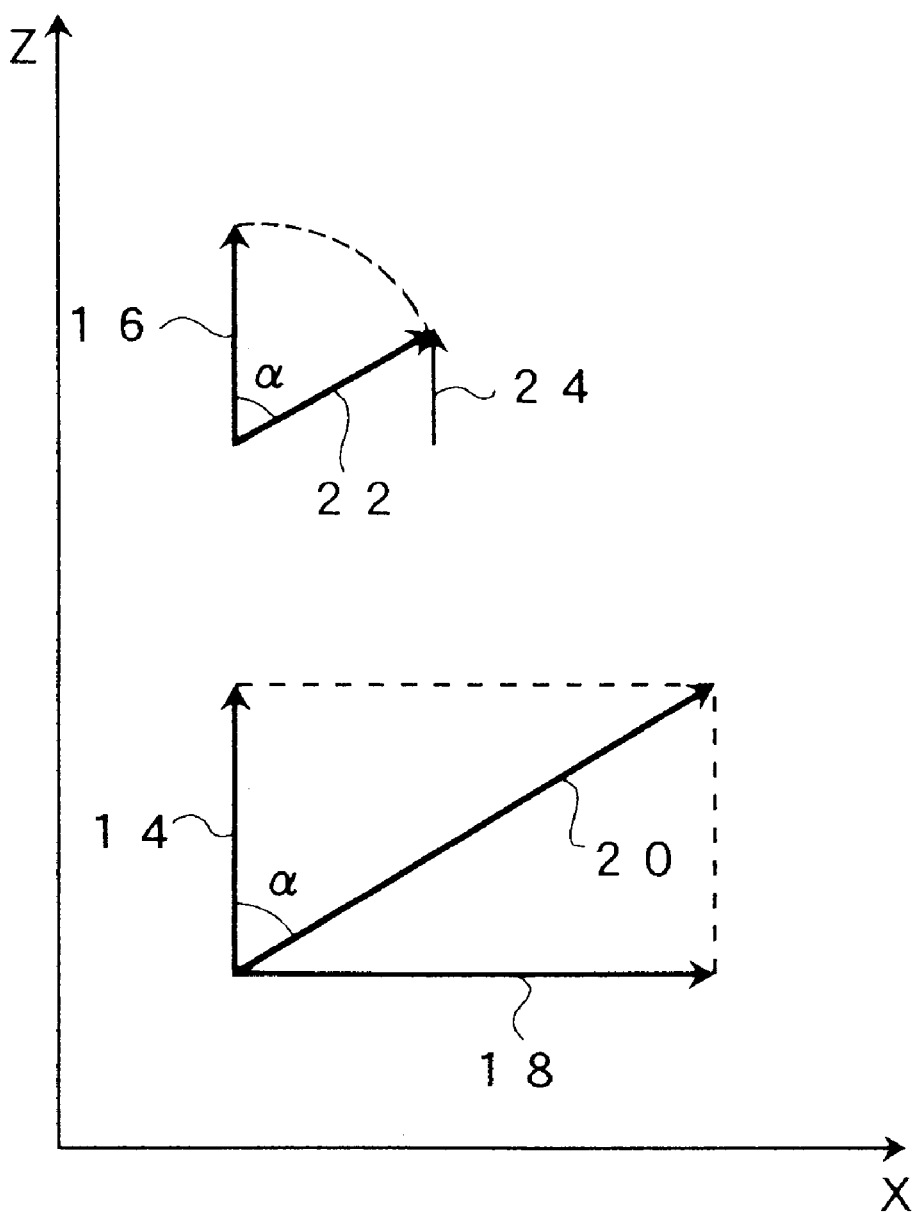
FIG. 2 is an explanatory diagram used for describing magnetic fields and magnetization in a magneto-optical crystal employed in the variable Faraday rotator shown in FIG. 1.
Figure 3:
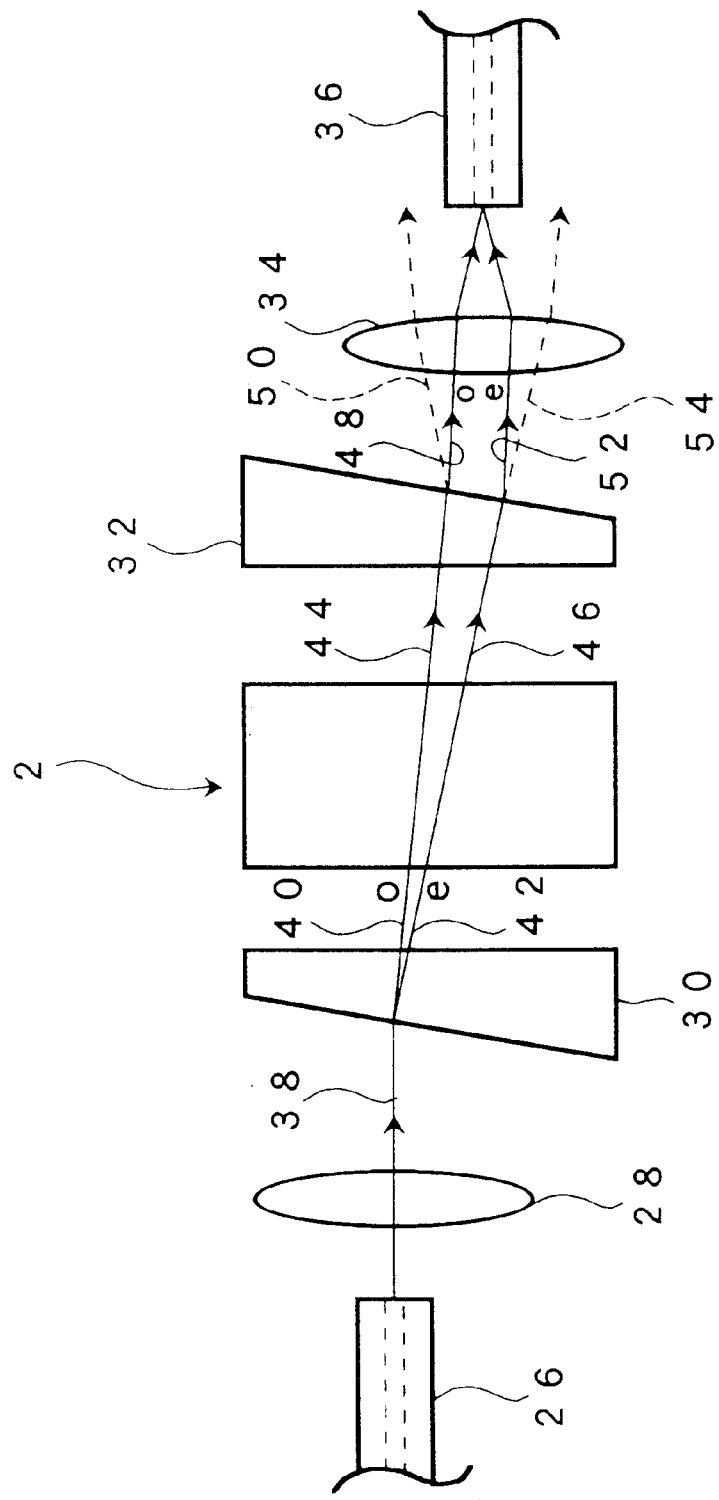
FIG. 3 is a diagram showing a variable optical attenuator provided by the conventional technology.

In order to make features of the present invention easy to understand, a conventional variable Faraday rotator and a variable optical attenuator employing the variable Faraday rotator are explained by referring to FIGS. 1 to 3 prior to description of embodiments provided by the present invention.

FIG. 1 is a diagram showing a squint view of a variable Faraday rotator 2 provided by the conventional technology. As shown in the figure, the variable Faraday rotator 2 comprises a magneto-optical crystal 4, a permanent magnet 6 for applying a magnetic field to the magneto-optical crystal 4, an electro-magnet 8 for applying another magnetic field to the magneto-optical crystal 4 in a direction perpendicular to the direction of the magnetic field applied by the permanent magnet 6, and a variable-current source 10 for supplying a driving current to the electro-magnet 8. The magneto-optical crystal 4 is made of thin-cut YIG or a material such as $(GdBi)_3$ $(FeAlGa)_5$ $O_{12}$ completing an epitaxial crystal growth process. The direction of the magnetic field applied by the permanent magnet 6 to the magneto-optical crystal 4 is parallel to a direction of propagation of a beam 12 through the magneto-optical crystal 4, that is, the direction of a Z axis. On the other hand, the direction of the magnetic field applied by the electro-magnet 8 to the magneto-optical crystal 4 is parallel to an X axis which is perpendicular to the Z axis. Also shown in the figure is a Y axis which is perpendicular to both the X and Z axes. The strength of a resultant magnetic field of the magnetic fields generated by the permanent magnet 6 and the electro-magnet 8 is set at such a value that the magnetization of the magneto-optical crystal 4 is always saturated.

FIG. 2 is an explanatory diagram used for describing the directions and the magnitudes of magnetization vectors in the magneto-optical crystal 4 employed in the variable Faraday rotator 2 shown in FIG. 1. Let us now consider a case in which a magnetic field is generated by only the permanent magnet 6 and applied to the magneto-optical crystal 4 as represented by a magnetic-field vector denoted by reference numeral 14. In this case, the resulting magnetization vector of the magneto-optical crystal 4 is parallel to the Z axis as indicated by reference numeral 16. At that time, the strength of the applied magnetic field (that is, the length of the magnetic-field vector 14) is set at such a value that the magnetization of the magneto-optical crystal 4 is saturated, that is, the length of the magnetization vector 16 does not increase any more. As a magnetic field generated by the electro-magnet 8 is also applied to the magneto-optical crystal 4 in a direction parallel to the X axis as represented by a magnetic-field vector denoted by reference numeral 18, a resultant magnetic field is resulted in as represented by a resultant magnetic-field vector denoted by reference numeral 20, that is a composition of the magnetic-field vectors 14 and 18. The resultant magnetic field represented by the resultant magnetic-field vector 20 gives rise to a magnetization vector denoted by reference numeral 22 in the magneto-optical crystal 4. The magnetization vector 22 and the magnetic-field vector 20 are parallel to each other. The saturation described earlier makes the length of the magnetization vector 22 equal to the length of the magnetization vector 16.

In spite of the fact that the magnitude of the magnetization of the magneto-optical crystal 4 is constant, the degree of contribution of the magnetization vector 16 to the Faraday-rotation angle is not the same as that of the magnetization vector 22. This is because the Faraday-rotation angle is also dependent on an angle formed by the direction of the magnetization vector and the propagation direction of the beam. The difference in degree of contribution to the Faraday-rotation angle can be explained by comparing the state of generation of the magnetization vector 16 with that of the magnetization vector 22. To put it in detail, the Z-axis component 24 of the magnetization vector 22 is shorter than the Z-axis component of the magnetization vector 16, that is, the magnetization vector 16 itself, making the Faraday-rotation angle caused by the Z-axis component 24 smaller by an amount corresponding to the difference between the Z-axis component 24 and the magnetization vector 16. The ratio of the Faraday-rotation angle generated by the magnetization vector 22 to the Faraday-rotation angle generated by the magnetization vector 16 is expressed by cos α where notation α is an angle formed by the magnetization vectors 16 and 22.

In this way, in the variable Faraday rotator 2 shown in FIG. 1, by varying the angle α through adjustment of the length of the magnetic-field vector 18 using the variable-current source 10, the Faraday-rotation angle provided to the beam 12 can be set at an arbitrary value. In addition, since the magnetization of the magneto-optical crystal 4 is always saturated, the problem caused by numerous magnetic domains as described above is also solved as well. The saturated state of the magnetization of the magneto-optical crystal 4 can be interpreted as a state in which substantially only one magnetic domain exists in the magneto-optical crystal 4.

FIG. 3 is a diagram showing a variable optical attenuator provided by the conventional technology. As shown in the figure, the variable optical attenuator comprises an optical fiber 26, a lens 28, a double-refraction wedge plate 30, the variable Faraday rotator 2 shown in FIG. 1, another double-refraction wedge plate 32, another lens 34, and another optical fiber 36 arranged after a light source not shown in the figure in the order they are enumerated.

The wedge plates 30 and 32 have the same shape. The top and the bottom of the wedge plate 30 face the bottom and the top of the wedge plate 32 respectively in such a way that the facing surfaces are parallel to each other. The optic axes of the wedge plates 30 and 32 lie on a plane perpendicular to the surface of the drawing sheet. The positional relation between the optic axes is determined by a value at which the loss at a zero-input to the variable-current source 10 of the Faraday rotator 2 is set. In the following description, the positional relation is determined so that the loss at the zero-input becomes a minimum value, and the optic axis of the wedge plate 30 is oriented in a direction parallel to the optic axis of the wedge plate 32.

A light radiated from the end of the optical fiber 26 is collimated by the lens 28 into parallel beam. This beam is represented as a beam denoted by reference numeral 38, ignoring the thickness of the beam. The beam 38 is splitted by the wedge plate 30 into a beam 40 corresponding to an ordinary ray (o) and a beam 42 corresponding to an extraordinary ray (e). The plane of polarization of the beam 40 is perpendicular to the plane of polarization of the beam 42. The planes of polarization of the beams 40 and 42 are each rotated by the same angle by the variable Faraday rotator 2, resulting in beams 44 and 46 respectively. The beam 44 is splitted by the wedge plate 32 into a beam 48 corresponding to an ordinary ray and a beam 50 corresponding to an extraordinary ray. By the same token, the beam 46 is splitted by the wedge plate 32 into a beam 52 corresponding to an extraordinary ray and a beam 54 corresponding to an ordinary ray.

Because of the refraction hysteresis (history) experienced by the beams 48, 50, 52 and 54, and the shapes and the layout of the wedge plates 30 and 32, the beams 48 and 52 are parallel to each other while the beam 50 is not parallel to the beam 54. As a result, only the beams 48 and 52 are converged by the lens 34, being directed to the optical fiber 36.

The ratio of the total power of the beams 48 and 52 to the total power of the beams 50 and 54 is dependent upon the Faraday-rotation angle in the Faraday rotator 2. In a state in which the Faraday-rotation angle of the Faraday rotator 2 is fixed, on the other hand, the total power of the beams 48 and 52 is not dependent upon the state of polarization of a light radiated from the end of the optical fiber 26. In this way, in the optical attenuator shown in FIG. 3, the degree of attenuation can be varied electrically as well as smoothly and is independent of the state of polarization of an input light.

Figure 4:
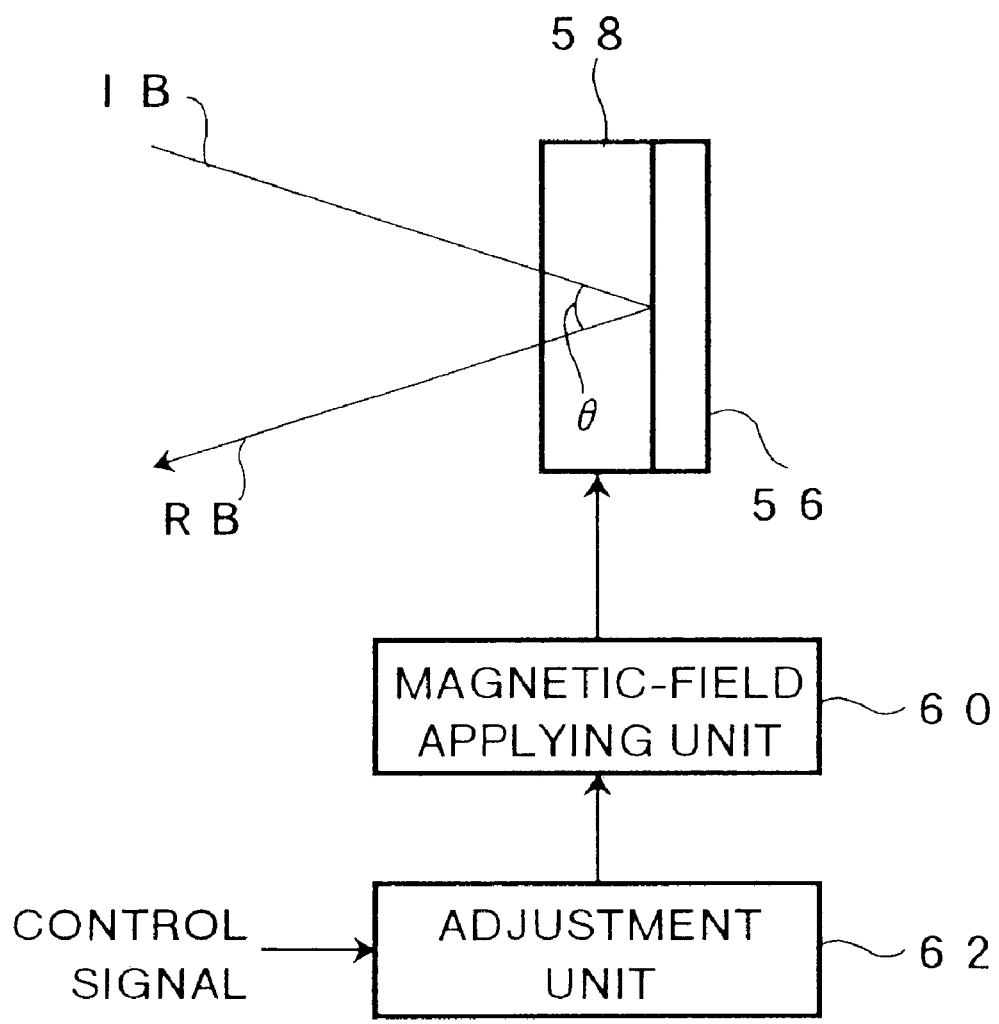
FIG. 4 is a diagram showing the basic configuration of a variable Faraday rotator provided by the present invention.

FIG. 4 is a diagram showing the basic configuration of a variable Faraday rotator provided by the present invention. As shown in the figure, the variable Faraday rotator comprises a reflector 56, a magneto-optical crystal 58, a magnetic-field applying unit 60 and an adjustment unit 62. The reflector 56 reflects an input beam IB as a reflected beam RB. The magneto-optical crystal 58 is provided at a position so as to pass both the input beam IB and the reflected beam RB. The magnetic-field applying unit 60 applies a magnetic field to the magneto-optical crystal 58 so that a Faraday-rotation angle is provided to each of the input and reflected beams IB and RB. The adjustment unit 62 controls the magnetic-field applying unit 60 so that the magnetic field applied to the magneto-optical crystal 58 is varied in accordance with a control signal supplied to the adjustment unit 62.

In this configuration, since both the input and reflected beams IB and RB pass through the magneto-optical crystal 58, substantially, the same Faraday-rotation angle is provided to the input and reflected beams IB and RB in the same rotational direction toward the direction of the applied magnetic field. As a result, under the same given magnetic-field condition, the thickness of the magneto-optical crystal 58 for obtaining a required Faraday-rotation angle can be substantially reduced by half in comparison with that provided by the conventional technology.

The scope of the present invention is not restricted by an angle θ formed by the input and reflected beams IB and RB. For θ=0 degrees, for example, the input and reflected beams IB and RB coincide with each other. In this case, an optical circulator to be described later is used for spatially separating the reflected beam RB from the input beam IB. In the case of a small angle θ which is greater than 0 degrees but smaller than 5 degrees, on the other hand, a common single lens can be used in order to couple the input and reflected beams IB and RB each to a respective optical fiber as will be described later. It is needless to say that a plurality of lenses can also be used to direct the input and reflected beams IB and RB each to a respective optical fiber. In addition, a concave mirror can be used as the reflector 56 in order to eliminate the lenses. FIG. 4 shows a reflector 56 closely adhered to the magneto-optical crystal 58. It should be noted, however, that the present invention is not limited to such a configuration. For example, air or another optical medium can exist in a gap between the reflector 56 and the magneto-optical crystal 58.

Figure 5:
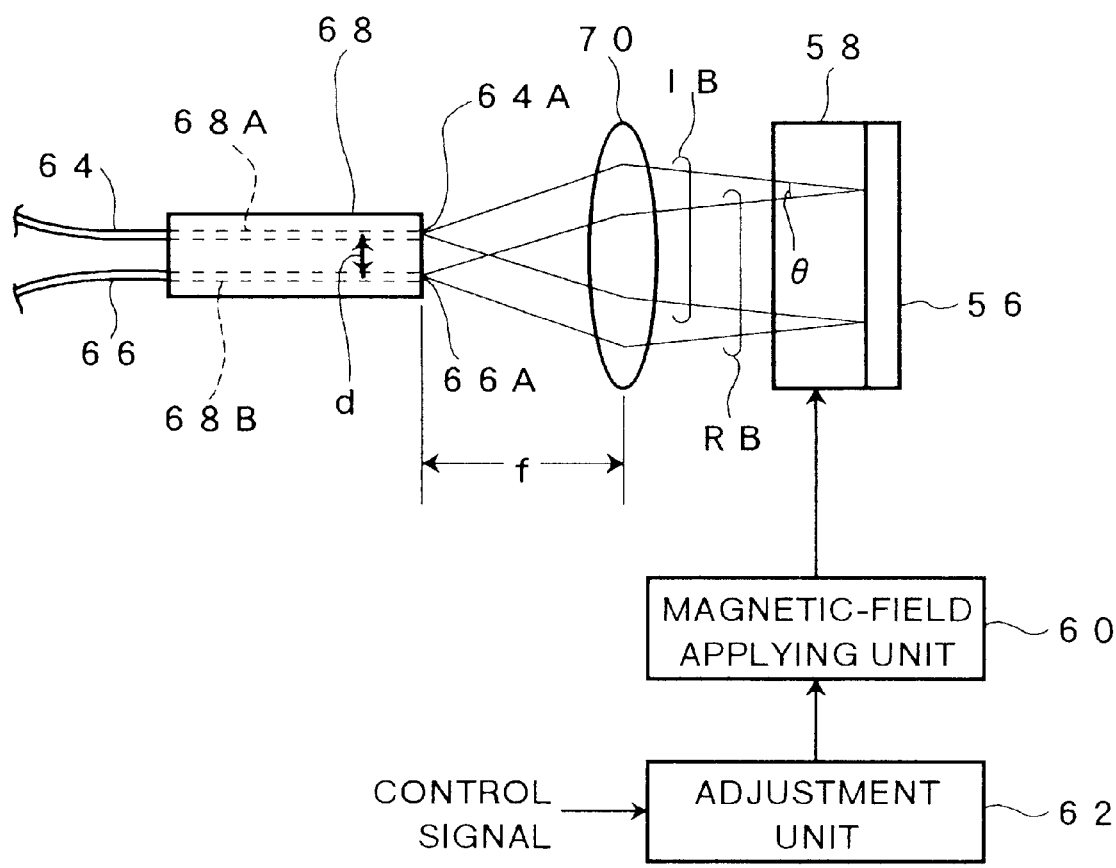
FIG. 5 is a diagram showing an embodiment implementing a variable Faraday rotator provided by the present invention.

FIG. 5 is a diagram showing an embodiment implementing a variable Faraday rotator provided by the present invention. As shown in the figure, a first optical fiber 64 is employed for supplying the input beam IB. By the same token, a second optical fiber 66 is employed for directing the reflected beam RB. In order to provide the ends 64A and 66A of the first and second optical fibers 64 and 66 respectively at positions separated away from each other by an infinitesimal distance d, the first and second optical fibers 64 and 66 are inserted firmly through parallel insertion holes 68A and 68B of a ferrule 68 respectively. In order to obtain the input beam IB by substantially collimating a conical beam radiated from the end 64A, a common single lens 70 facing both the ends 64A and 66A is provided. Here, the reflector 56 has a flat reflecting surface which is inclined slightly with respect to the input and reflected beams IB and RB at an angle of inclination equal to θ/2.

By making the relative positional relation among the elements satisfy a proper condition, the reflected beam RB can be converged by the lens 70 to be applied to the end 66A of the second optical fiber 66 as a focused incident light. The condition is typically expressed by the following equation:

$$d = f \times \tan\theta$$

where notation θ is an angle formed by the input and reflected beams IB and RB, notation f is the focus distance of the lens 70 and notation d is the distance from the end 64A to the end 66A.

Since a technology for manufacturing a ferrule having two insertion holes has been established, the distance from the end 64A to the end 66A can be set with a high degree of accuracy, allowing the amount of coupling loss to be reduced. In addition, since the variable Faraday rotator can be assembled by merely adjusting the relative positional relation among the ferrule 68, the lens 70 and the reflector 56, the manufacturing work can be simplified in comparison with that of the conventional technology. On the top of that, the use of a common single lens 70 allows the variable Faraday rotator to be made compact as well as to be manufactured at a low cost.

It is ideal to employ a magnetic-field applying unit 60 which comprises a first magnet for applying a first magnetic field to the magneto-optical crystal 58 in a first direction and a second magnet for applying a second magnetic field to the magneto-optical crystal 58 in a second direction different from the first direction. In this case, under a condition that the magnetization of the magneto-optical crystal 58 is saturated, the adjustment unit 62 varies the first and/or second magnetic fields, allowing the Faraday-rotation angle to be changed. Accompanying the saturation of the magnetization of the magneto-optical crystal 58, the number of magnetic domains is reduced to one. As a result, the reproducibility of the Faraday-rotation angle is improved and, at the same time, the amount of loss due to scattering is also reduced as well.

It is further desirable to implement the first and second magnets by a permanent magnet and an electro-magnet respectively. The adjustment unit 62 is implemented by a variable-current source which is connected to the electro-magnet.

It is still further desirable to set the first and second directions so that they are in essence perpendicular to each other. In such a scheme, the change in Faraday-rotation angle per unit of change in first and/or second magnetic field can be increased.

Figure 6:
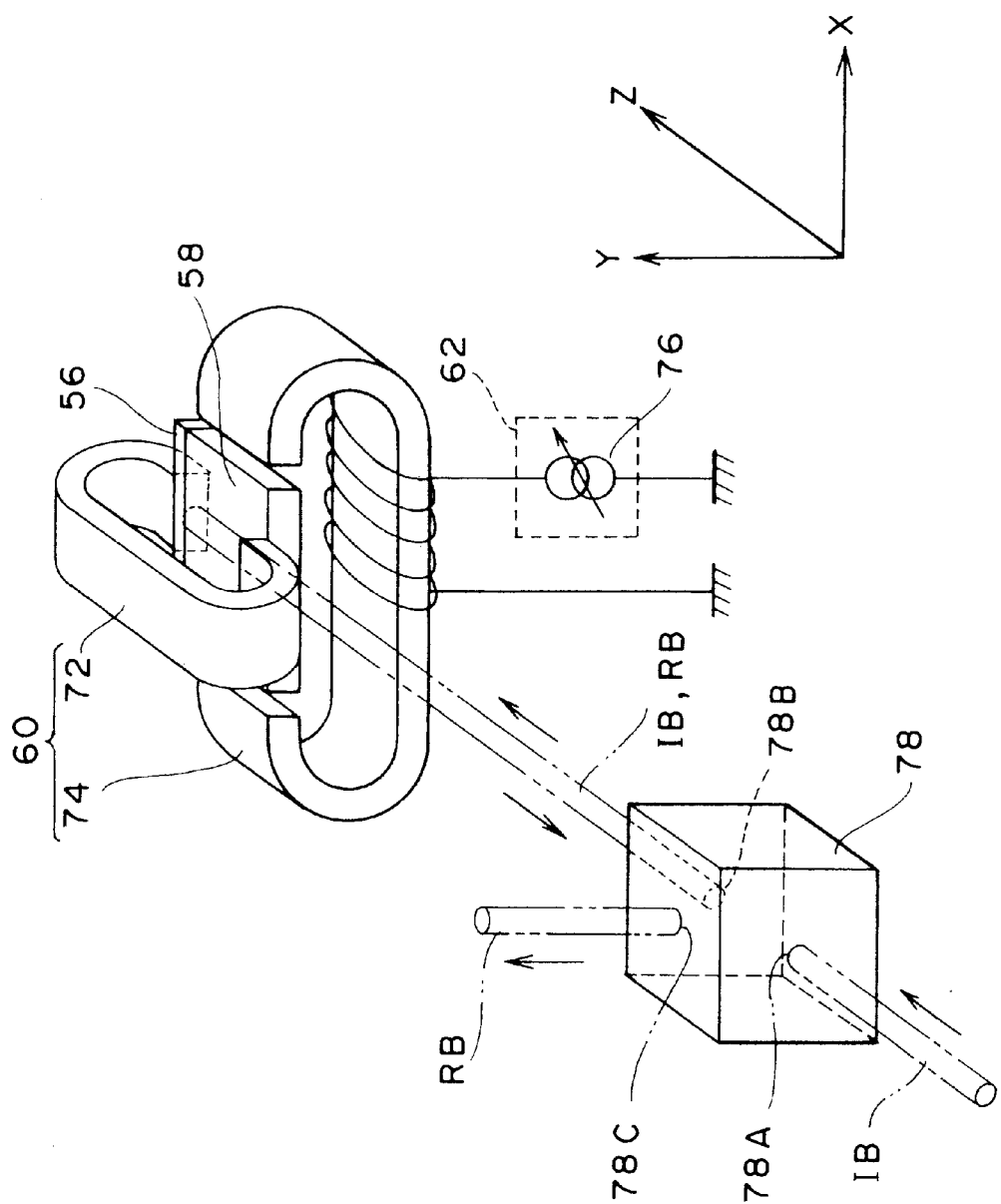
FIG. 6 is a diagram showing another embodiment implementing a variable Faraday rotator provided by the present invention.

FIG. 6 is a diagram showing another embodiment implementing a variable Faraday rotator provided by the present invention. In the case of the present embodiment, the magneto-optical crystal 58 has a cubical shape oriented in such a way that the sides of the magneto-optical crystal 58 are laid along the X, Y and Z axes respectively. The X, Y and Z axes serve as orthogonal three-dimensional coordinates. The reflector 56 is implemented by a reflective film such as a dielectric multi-layer film deposited on a surface parallel to the XY plane of the magneto-optical crystal 58. Since the reflective film can be created into a small thickness, the reflective film is appropriate for a small-size variable Faraday rotator. In addition, the dielectric multi-layer film is easy to manufacture. The magnetic-field applying unit 60 comprises a permanent magnet 72 for applying a fixed magnetic field to the magneto-optical crystal 58 in the Z-axis direction and an electro-magnet 74 for applying a variable magnetic field to the magneto-optical crystal 58 in the X-axis direction. The adjustment unit 62 includes a variable-current source 76 which is connected to the electro-magnet 74. The variable-current source 76 adjusts a current flowing through a coil of the electro-magnet 74 in accordance with a control signal supplied to the variable-current source 76 by an external source.

In the case of the embodiment shown in FIG. 6, at a location in close proximity to the reflector 56, the input and reflected beams IB and RB are parallel to the Z axis and coincide with each other. In order to separate the input and reflected beams IB and RB from each other, an optical circulator 78 is used. The optical circulator 78 has three ports 78A, 78B and 78C. The input beam IB passes through the port 78A and then the port 78B before entering the magneto-optical crystal 58. The reflected beam RB from the reflector 56 is output after passing through the port 78B and then the port 78C of the optical circulator 78. With the input and reflected beams IB and RB propagating in a direction perpendicular to the reflector 56 as is the case with the present embodiment, the optical axes are easy to adjust.

In the case of the embodiment shown in FIG. 6, a fixed magnetic field generated by the permanent magnet 72 can be applied to the magneto-optical crystal 58 effectively. The effective application of the magnetic field is explained by comparison with the variable Faraday rotator shown in FIG. 1 according to the conventional technology as follows.

Since a practical permanent magnet is not transparent, in the conventional technology, it is necessary to place the two poles of the permanent magnet 6, that is, the N and S poles, at a location offset from the beam 12 as shown in FIG. 1. For this reason, the magnetic resistance of a magnetic circuit comprising the permanent magnet 6 and the magneto-optical crystal 4 increases, making it impossible to apply the magnetic field generated by the permanent magnet 6 to the magneto-optical crystal 4 effectively.

In the case of the embodiment shown in FIG. 6, on the other hand, since a going and returning light-beam path is created by the reflector 56, by placing the reflector 56 between one pole of the permanent magnet 72 and one end surface of the magneto-optical crystal 58, the magnetic resistance of a magnetic circuit comprising the permanent magnet 72 and the magneto-optical crystal 58 can be reduced. As a result, the magnetic field generated by the permanent magnet 72 can be applied to the magneto-optical crystal 58 effectively, allowing the size of the permanent magnet 72 to be decreased on the top of reduction of the size of the permanent magnet 72 accompanying reduction in size of the magneto-optical crystal 58. Since the thickness of the reflector 56 made of a dielectric multi-layer film is normally only several $\mu$m, the magnetic resistance thereof is negligible as a matter of fact.

On the other hand, since the electro-magnet 74 is used for applying a magnetic field to the magneto-optical crystal 58 in the X-axis direction, the two poles of the electro-magnet 74 can be adhered to two end surfaces of the magneto-optical crystal 58, allowing the magnetic resistance of a magnetic circuit comprising the electro-magnet 74 and the magneto-optical crystal 58 to be reduced. It should be noted that FIG. 6 shows an air gap formed between the two poles of the electro-magnet 74 and the magneto-optical crystal 58 only in order to preserve the clarity of the drawing. By setting the magnetic field generated by the electro-magnet 74 in a direction virtually perpendicular to the input and reflected beams IB and RB in this way, the magnetic resistance of the magnetic circuit can be reduced, allowing the electro-magnet 74 to be decreased in size and the amount of power consumed thereby to be reduced as well.

Figure 7:
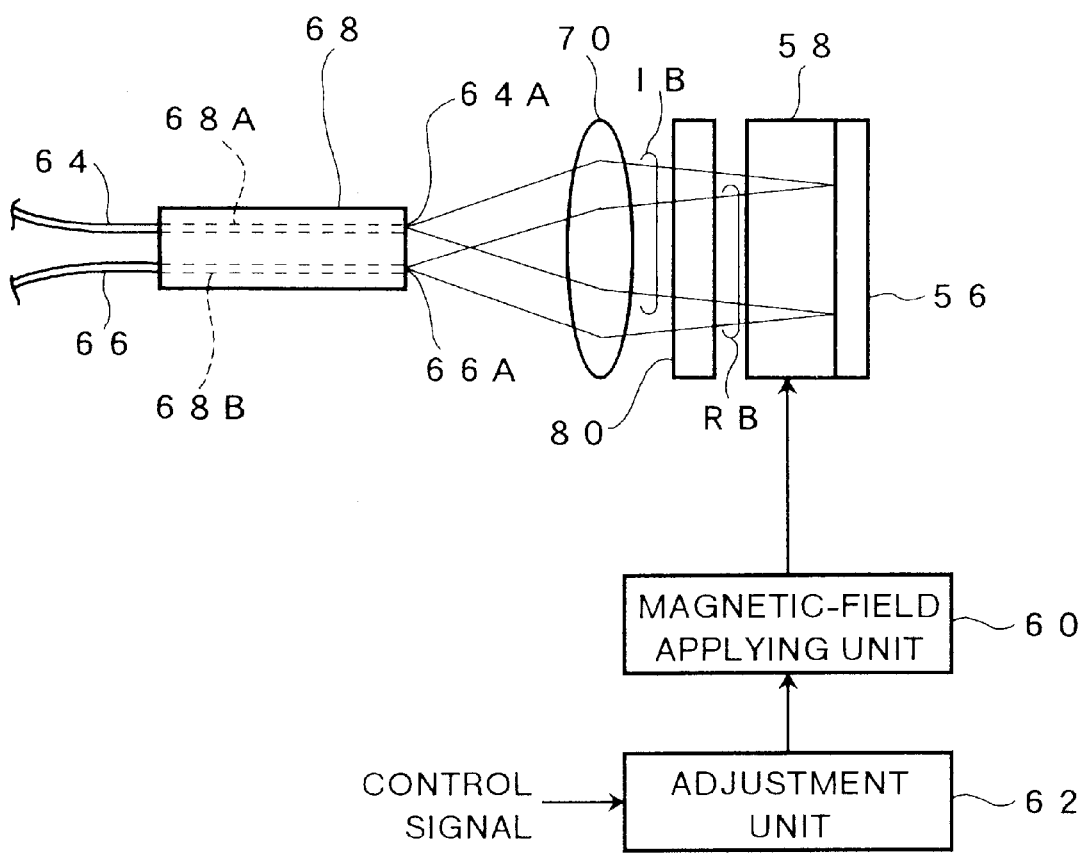
FIG. 7 is a diagram showing an embodiment implementing a variable optical attenuator provided by the present invention.

FIG. 7 is a diagram showing an embodiment implementing a variable optical attenuator provided by the present invention. In comparison with the variable Faraday rotator shown in FIG. 5, this variable optical attenuator is characterized in that a polarizer 80 is provided between the lens 70 and the magneto-optical crystal 58.

The technical term 'polarizer' used in the present application means a device for selectively passing only a linearly polarized wave having a predetermined plane of polarization among beams supplied thereto or a device or, concretely speaking, a polarization beam splitter, for splitting a beam supplied thereto into two linearly polarized waves having planes of polarization perpendicular to each other.

The polarizer 80 shown in FIG. 7 typically selectively passes only a linearly polarized wave component of the input beam IB that has a plane of polarization parallel to the surface of the drawing sheet. The magneto-optical crystal 58 provides a Faraday-rotation angle to the linearly polarized wave twice. As a result, the degree of attenuation which is determined by the angle formed by the plane of polarization of the reflected beam RB and the surface of the drawing sheet is varied in accordance with a control signal. In the case of a plane of polarization of the reflected beam RB parallel to the surface of the drawing sheet, a minimum attenuation is obtained. In the case of a plane of polarization of the reflected beam RB perpendicular to the surface of the drawing sheet, a maximum attenuation is obtained. In this case, the reflected beam RB basically does not pass through the polarizer 80. As such, the present embodiment allows a variable optical attenuator capable of electrically varying the degree of attenuation to be provided.

Since the polarizer 80 employed in the embodiment shown in FIG. 7 selectively passes only a linearly polarized wave component having a particular plane of polarization, with the Faraday-rotation angle of the magneto-optical crystal 58 fixed, the attenuation varies in dependence on the state of polarization of the input beam IB. That is to say, the optical attenuator shown in FIG. 7 exhibits a polarization dependent characteristic. According to the present invention, however, it is also possible to provide a variable optical attenuator that is independent of the polarization. A variable optical attenuator that is independent of the polarization is explained as follows.

Figure 8:
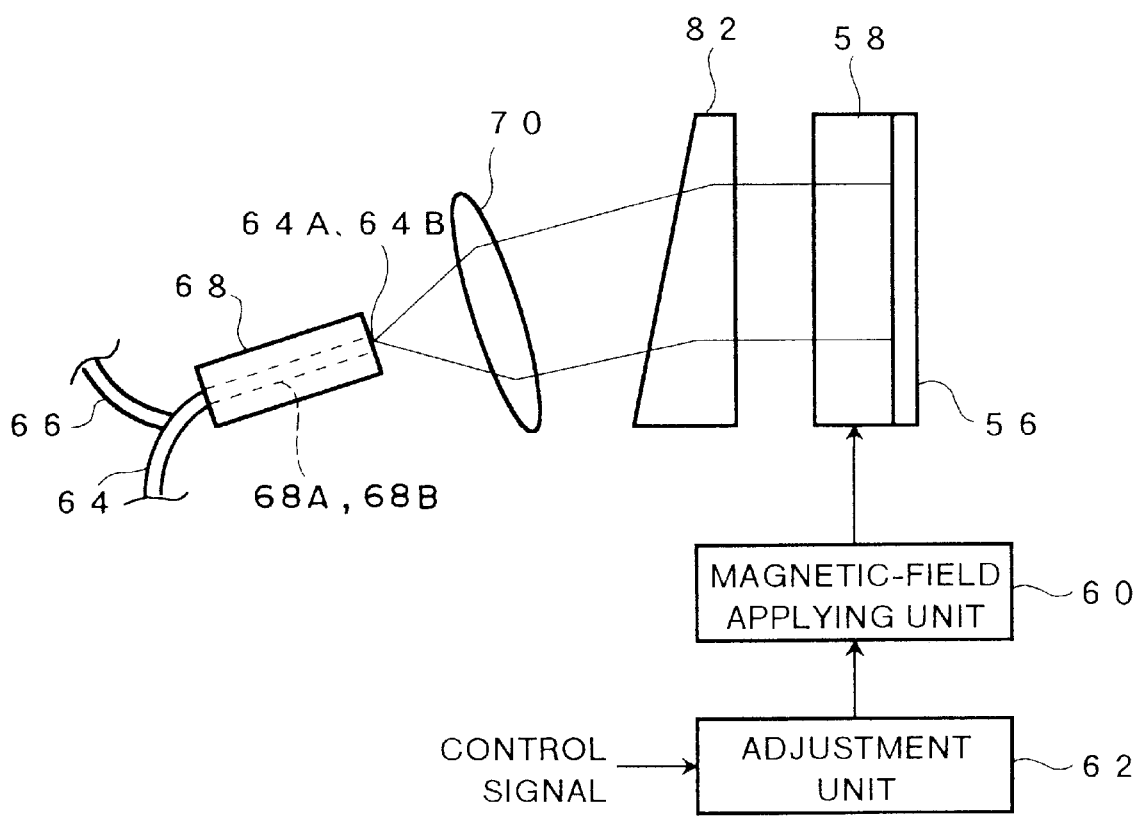
FIG. 8 is a diagram showing an embodiment implementing a polarization-independent variable optical attenuator provided by the present invention.

FIG. 8 is a diagram showing an embodiment implementing a polarization-independent variable optical attenuator provided by the present invention. In comparison with the optical attenuator shown in FIG. 7, the present embodiment is characterized in that a double-refraction (birefringent) wedge plate 82 is employed as a polarizer. The wedge plate 82 splits an incident beam into an ordinary ray and an extraordinary ray which propagate in directions different from each other. As a material for making the wedge plate 82, rutile can be used. In this case, by setting the wedge angle at 4 degrees, an angle of separation of about 1 degrees between the ordinary ray and extraordinary ray can be obtained. In the case of a wedge plate 82 made of rutile, the refractive index of the extraordinary ray is greater than that of the ordinary ray. The wedge plate 82 has an optic axis perpendicular to the surface of the drawing sheet.

It should be noted that the ferrule 68 shown in FIG. 8 is rotated by 90 degrees in comparison with that shown in FIG. 7. To put it in detail, the optical fibers 64 and 66 shown in FIG. 7 are arranged inside the ferrule 68 on a plane parallel to the surface of the drawing sheet. On the other hand, the optical fibers 64 and 66 shown in FIG. 8 are arranged inside the ferrule 68 on a plane perpendicular to the surface of the drawing sheet.

Figure 9:
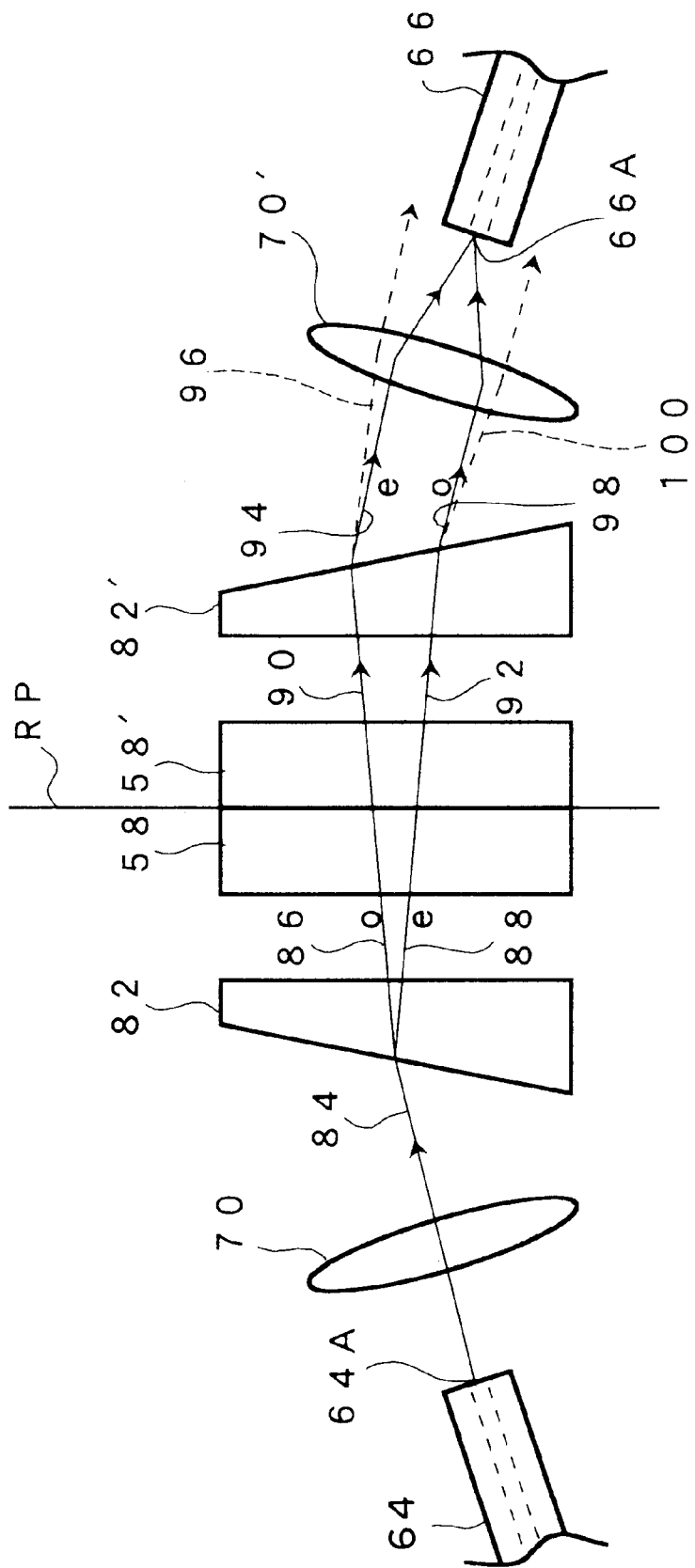
FIG. 9 is a diagram used for explaining the operation of the variable optical attenuator shown in FIG. 8.

FIG. 9 is a diagram used for explaining the operation of the variable optical attenuator shown in FIG. 8. The use of the reflector 56 allows the operation of the variable optical attenuator shown in FIG. 8 to be understood with ease by imagining a hypothetical fold-back configuration with respect to the reflective plane RP of the reflector 56 as shown in FIG. 9. FIG. 9 shows a hypothetical magneto-optical crystal 58', a hypothetical wedge plate 82' and a hypothetical lens 70' provided at locations symmetrical with those of the magneto-optical crystal 58, the wedge plate 82 and the lens 70 respectively with respect to the reflective plane RP. This hypothetical imagination allows an optical path from the first optical fiber 64 to the second optical fiber 66 to be understood with ease. It should be noted that the magnetic-field applying unit 60 and the adjustment unit 62 are not shown in FIG. 9 to make the diagram look simple.

A light radiated from the exiting end 64A of the first optical fiber 64 is substantially collimated by the lens 70 into parallel beam. This beam is represented as a beam denoted by reference numeral 84, ignoring the thickness of the beam. The beam 84 is splitted by the wedge plate 82 into a beam 86 corresponding to an ordinary ray (o) and a beam 88 corresponding to an extraordinary ray (e). The plane of polarization of the beam 86 is perpendicular to the plane of polarization of the beam 88. The planes of polarization of the beams 86 and 88 are each rotated by the same angle by the magneto-optical crystals 58 and 58' toward the direction of propagation, resulting in beams 90 and 92 respectively.

The beam 90 is splitted by the wedge plate 82' into a beam 96 corresponding to an ordinary ray and a beam 94 corresponding to an extraordinary ray. By the same token, the beam 92 is splitted by the wedge plate 82' into a beam 98 corresponding to an ordinary ray and a beam 100 corresponding to an extraordinary ray. The beam 94 experiences refraction at the wedge plate 82 as an ordinary ray but experiences refraction at the wedge plate 82' as an extraordinary ray. On the other hand, the beam 96 experiences refraction as an ordinary ray at both the wedge plates 82 and 82. In contrast to the beam 94, the beam 98 experiences refraction at the wedge plate 82 as an extraordinary ray but experiences refraction at the wedge plate 82 as an ordinary ray. By the same token, in contrast to the beam 96, the beam 100 experiences refraction as an extraordinary ray at both the wedge plates 82 and 82'.

Since the hypothetical wedge plate 82' is imagined to have the same shape as the wedge plate 82, the beams 94 and 98 propagate along optical paths parallel to each other. As a result, the beams 94 and 98 are converged by the lens 70', allowing them to be entered to the end 66A of the second optical fiber 66 as a focused beam. At that time, the beams 96 and 100 are not lead to the optical fiber 66 under a certain condition. The condition is typically expressed by the following relation:

$$a/f < \tan\phi$$

where notation $\phi$ is the angle of separation of the wedge plate 82, notation a is the diameter of the core of the second optical fiber 66 and notation f is the focus distance of the lens 70.

Well, the ratio of the total power of the beams 94 and 98 to the total power of the beams 96 and 100 is dependent upon the Faraday-rotation angles provided by the magneto-optical crystals 58 and 58'. As a result, by changing the Faraday-rotation angle by means of the magnetic-field applying unit 60 shown in FIG. 8, the coupling efficiency of a light propagating from the first optical fiber 64 to the second optical fiber 66 which indicates the degree of attenuation of the optical attenuator can be varied. In particular, by operating the optical attenuator with the magnetization of the magneto-optical crystal 58 put in a saturated state much like the embodiment shown in FIG. 6, the degree of attenuation can be varied smoothly. In the case of a fixed Faraday-rotation angle, on the other hand, the total power of the beams 94 and 98 is not dependent on the state of polarization of a light radiated from the first optical fiber 64. This is because the beam 84 consists of the ordinary and extraordinary components in the wedge plate 82. As a result, the present embodiment is capable of electrically changing the degree of attenuation, thus, allowing an optical attenuator with the degree of attenuation thereof independent of the state of polarization of the input beam to be provided.

With the Faraday-rotation angle of the magneto-optical crystal 58 equal to 0 degrees, the entire beam 86 becomes the beam 96 while the beam 88 all turns the beam 100. In this case, the degree of attenuation reaches its maximum value. With the Faraday-rotation angle of the magneto-optical crystal 58 equal to 45 degrees, on the other hand, the total Faraday-rotation angle is equal to 90 degrees and the entire beam 86 becomes the beam 94 while the beam 88 all turns the beam 98. In this case, the degree of attenuation reaches its minimum value.

If the magnetic-field applying unit 60 and the adjustment unit 62 like the ones shown in FIG. 6 are employed in the present embodiment, by arranging the present embodiment so that the magneto-optical crystal 58 in essence provides a Faraday-rotation angle equal to 45 degrees when the intensity of the magnetic field generated by the electro-magnet 74 is zero, a minimum degree of attenuation corresponding to a zero current can be obtained, giving rise to convenience in the practical use of the variable optical attenuator. As an alternative, by arranging the present embodiment so that the magneto-optical crystal 58 substantially provides a Faraday-rotation angle greater than 45 degrees, say, a Faraday-rotation angle of 50 degrees, when the intensity of the magnetic field generated by the electro-magnet 74 is zero, a greater dynamic range can be obtained by flowing a smaller current.

The present embodiment allows a variable optical attenuator with a small polarized-wave dispersion to be provided as explained below through comparison with the variable optical attenuator shown in FIG. 3. In the variable optical attenuator shown in FIG. 3, the beam 48 lead to the optical fiber 36 experiences refraction as an ordinary ray in both the wedge plates 30 and 32. On the other hand, the beam 52 lead to the optical fiber 36 experiences refraction as an extraordinary ray in both the wedge plates 30 and 32. Thus, a delay time results between the beams 48 and 52. As a result, it is quite within the bounds of possibility that dispersion of the polarized waves occurs. In the case of the present embodiment, on the other hand, the hysteresis (history) of the refraction of the beams 94 and 98 lead to the optical fiber 66 exists as described earlier so that the time delays caused by the refractions mutually cancel each other. As a result, the problem of the polarized-wave dispersion is solved. In addition, since only one wedge plate 82 is sufficient for the present embodiment to operate, it is possible to make the variable optical attenuator small in size, to produce it at a low cost and to simplify the work of manufacturing the attenuator.

Figure 10:
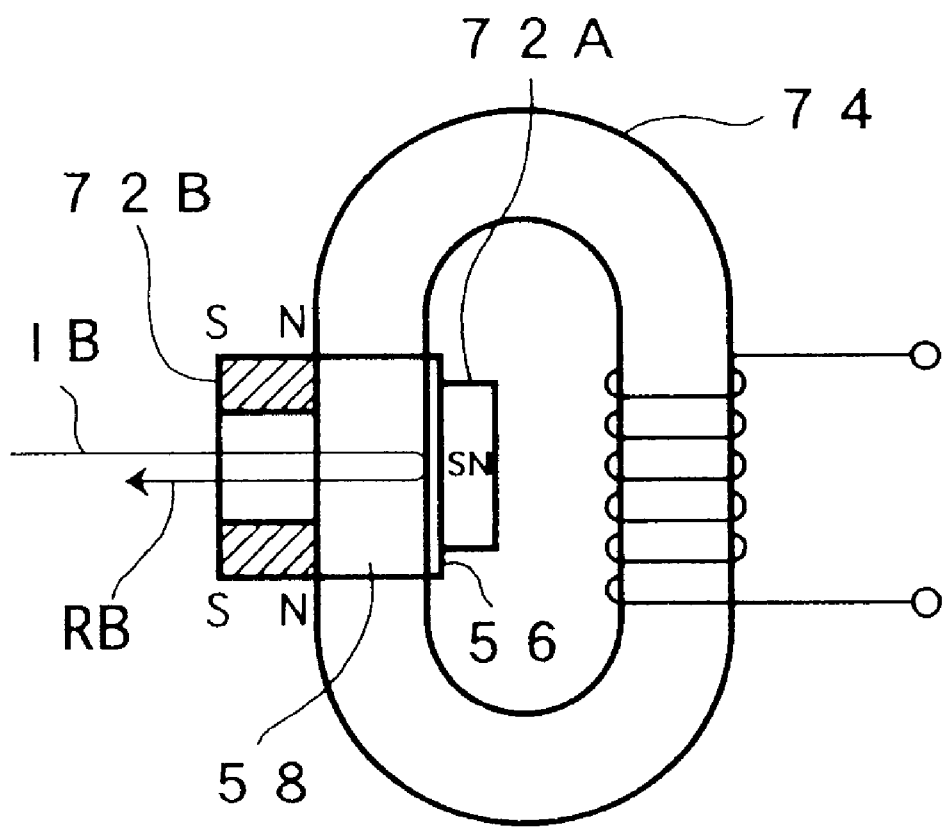
FIG. 10 is a diagram showing another embodiment implementing a magnetic-field applying unit which is applicable to the present invention.

FIG. 10 is a diagram showing another embodiment implementing a magnetic-field applying unit 60. In comparison with that employed in the variable optical attenuator shown in FIG. 6, two permanent magnets 72A and 72B are used. The permanent magnet 72A has a plate shape. A reflector 56 is tightly adhered between a flat plane of the permanent magnet 72A which serves as one of the poles thereof (that is, the S pole shown in the figure) and the magneto-optical crystal 58. The permanent magnet 72B has a ring-like shape with an opening at the center thereof through which the input and reflected beams IB and RB pass. In order for the permanent magnets 72A and 72B to be able to provide a fixed magnetic field which is essentially parallel to the input and reflected beams IB and RB, the end surface of the permanent magnet 72B serving as the N pole thereof is firmly attached to the end surface of the magneto-optical crystal 58 on the opposite side of the permanent magnet 72A. According to the present embodiment, a magnetic field can be applied effectively to the magneto-optical crystal 58. As a result, the embodiment is appropriate for the down sizing of a magnetic-field applying unit.

As described above, the present embodiment provides advantages including that it is possible to reduce the size and the price of an optical device such as an optical attenuator that makes use the magneto-optical effect.

It should be noted that, while the present invention has been described with reference to some illustrative preferred embodiments, the description is not intended to be construed in a limiting sense. That is to say, it is to be understood that the subject matter encompassed by the present invention is not limited to the details of the above described preferred embodiments. The scope of the present invention is defined by the appended claims and all changes and modifications falling within the equivalence of the scope of the claims are therefore to be embraced by the present invention.

What is claimed is:

1. An optical device comprising:
   a reflector for reflecting an input beam as a reflected beam;
   a magneto-optical crystal provided so as to pass said input and reflected beams;
   a first means for applying a magnetic field to said magneto-optical crystal; and
   a second means for varying said magnetic field in accordance with a control signal, wherein
   said first means comprises a first magnet for applying a first magnetic field to said magneto-optical crystal in a first direction and a second magnet for applying a second magnetic field to said magneto-optical crystal in a second direction different from said first direction, and strengths of said first and second magnetic fields are set at such values that magnetization of said magneto-optical crystal is saturated, and
   each of said input and reflected beams is Faraday rotated by said magneto-optical crystal in one direction.

2. An optical device according to claim 1, further comprising a first optical fiber for providing said input beam and a second optical fiber for leading said reflected beam.

3. An optical device according to claim 2, wherein:
   said first optical fiber has a first end whereas said second optical fiber has a second end;
   said first end is separated away from said second end by a predetermined infinitesimal distance;
   a lens is further provided for substantially collimating a beam radiated from said first end to generate said input beam; and
   said reflector is slightly inclined with respect to said input and reflected beams so that said reflected beam is converged by said lens before being supplied to said second end.

4. An optical device according to claim 3, wherein a condition $d=f\times\tan\theta$ is substantially satisfied, where notation $\theta$ is an angle formed by said input and reflected beams, notation f is a focus distance of said lens, and notation d is a distance from said first end to said second end.

5. An optical device according to claim 2, further comprising a ferrule with two insertion holes for inserting said first and second optical fibers respectively.

6. An optical device according to claim 1, wherein an angle formed by said input and reflected beams is virtually zero and an optical circulator is further provided for separating said reflected beam from said input beam.

7. An optical device according to claim 1, wherein said reflector comprises a reflective film provided on said magneto-optical crystal.

8. An optical device according to claim 7, wherein said first means includes a magnet and either of N and S poles of said magnet is adhered to said reflective film.

9. An optical device according to claim 7, wherein said reflector comprises a multi-layer reflective film.

10. An optical device according to claim 1, wherein said first and second magnets are a permanent magnet and an electro-magnet respectively and said second means includes a variable-current source connected to said electro-magnet.

11. An optical device according to claim 10, wherein said first and second directions are substantially perpendicular to each other.

12. An optical device according to claim 10, wherein said second direction is substantially perpendicular to said input and reflected beams.

13. An optical device according to claim 12, wherein said magneto-optical crystal provides a Faraday-rotation angle substantially equal to 45 degrees to said input and reflected beams when said second magnetic field is set to zero.

14. An optical device according to claim 12, wherein said magneto-optical crystal provides a Faraday-rotation angle substantially greater than 45 degrees to said input and reflected beams when said second magnetic field is set to zero.

15. An optical device according to claim 12, wherein:
   said permanent magnet comprises a first permanent magnet having a flat surface and a second permanent magnet having an opening;
   said reflector is adhered between said flat surface and said magneto-optical crystal; and
   said input and reflected beams pass through said opening.

16. An optical device according to claim 1, further comprising:
   a first optical fiber having a first end for providing said input beam;
   a second optical fiber having a second end for leading said reflected beam;
   a lens facing said first and second ends; and a polarizer provided between said lens and said magneto-optical crystal, whereby attenuation of said reflected beam relative to said input beam is changed in accordance with said control signal.

17. An optical device according to claim 16, wherein said polarizer comprises a double-refraction wedge plate for splitting said input beam into an ordinary ray and an extraordinary ray propagating in directions different from each other so that said attenuation becomes no longer dependent on a polarization state of said input beam.

18. An optical device according to claim 17, wherein a condition $a/f < \tan \phi$ is substantially satisfied, where notation $\phi$ is an angle formed by said ordinary ray and said extraordinary ray, notation a is a diameter of a core of said second optical fiber, and notation f is a focus distance of said lens.

19. An optical device comprising:

a reflector for reflecting an input beam as a reflected beam;

a magneto-optical crystal provided so as to pass said input and reflected beams;

a first magnet device applying a magnetic field to said magneto-optical crystal; and a second magnet device varying said magnetic field in accordance with a control signal, wherein said first magnet device comprises a first magnet for applying a first magnetic field to said magneto-optical crystal in a first direction and a second magnet for applying a second magnetic field to said magneto-optical crystal in a second direction different from said first direction, said first and second magnets are a permanent magnet and an electro-magnet, respectively, and said second magnet device includes a variable-current source connected to said electro-magnet, and the input beam and the reflected beam are both Faraday rotated by the magneto-optical crystal in one direction.

20. An optical device according to claim 19, wherein said first and second directions are substantially perpendicular to each other.

21. An optical device according to claim 19, wherein said second direction is substantially perpendicular to said input and reflected beams.

22. An optical device according to claim 21, wherein said magneto-optical crystal provides a Faraday-rotation angle substantially equal to 45 degrees to said input and reflected beams when said second magnetic field is set to zero.

23. An optical device according to claim 21, wherein said magneto-optical crystal provides a Faraday-rotation angle substantially greater than 45 degrees to said input and reflected beams when said second magnetic field is set to zero.

24. An optical device according to claim 21, wherein:

said permanent magnet comprises a first permanent magnet having a flat surface and a second permanent magnet having an opening;

said reflector is adhered between said flat surface and said magneto-optical crystal; and said input and reflected beams pass through said opening.

25. An optical device comprising:

a reflector for reflecting an input beam as a reflected beam;

a magneto-optical crystal provided so as to pass said input and reflected beams;

a magnet device applying a magnetic field to said magneto-optical crystal;

a magnetic field varying device varying said magnetic field in accordance with a control signal;

a first optical fiber having a first end for providing said input beam;

a second optical fiber having a second end for leading said reflected beam;

a lens facing said first and second ends; and a polarizer provided between said lens and said magneto-optical crystal, wherein attenuation of said reflected beam relative to said input beam is changed in accordance with said control signal, wherein the input beam and the reflected beam are both Faraday rotated by the magneto-optical crystal in one direction.

26. An optical device according to claim 25, wherein said polarizer comprises a double-refraction wedge plate for splitting said input beam into an ordinary ray and an extraordinary ray propagating in directions different from each other so that said attenuation becomes no longer dependent on a polarization state of said input beam.

27. An optical device according to claim 26, wherein a condition $a/f < \phi \tan$ is substantially satisfied, where notation $\phi$ is an angle formed by said ordinary ray and said extraordinary ray, notation a is a diameter of a core of said second optical fiber, and notation f is a focus distance of said lens.

28. An optical device comprising:

a reflector reflecting an input beam, to thereby provide a reflected beam;

a magneto-optical crystal, the input beam and the reflected beam both passing through the magneto-optical crystal;

a first magnet applying a first magnetic field to the magneto-optical crystal in a first direction; and a second magnet applying a second magnetic field to the magneto-optical crystal in a second direction different from the first direction, the first and second magnetic fields combining to form a resulting magnetic field applied to the magneto-optical crystal, strengths of the first and second magnetic fields causing a magnetization of the magneto-optical crystal to be saturated; and a magnetic field varying device varying the resulting magnetic field in accordance with a control signal, wherein the input beam and the reflected beam are both Faraday rotated by the magneto-optical crystal in one direction.

29. An optical device according to claim 28, further comprising a first optical fiber providing the input beam to the reflector; and a second optical fiber receiving the reflected beam.

30. An optical device according to claim 29, wherein:

an end of the first fiber is separated away from an end of the second fiber by a predetermined infinitesimal distance;

a lens substantially collimating a beam radiated from the end of the first fiber to generate the input beam; and the reflector is slightly inclined with respect to the input and reflected beams so that the reflected beam is converged by the lens and then received by the end of the second fiber.

31. An optical device according to claim 30, wherein a condition $d = f \times \tan \theta$ is substantially satisfied, where $\theta$ is an angle formed by the input and reflected beams, f is a focus distance of the lens, and d is a distance from the end of the first fiber to the end of the second fiber.

32. An optical device according to claim 28, wherein an angle formed by the input and reflected beams is virtually zero and an optical circulator is further provided for separating the reflected beam from the input beam.

33. An optical device according to claim 28, wherein the reflector comprises a reflective film provided on the magneto-optical crystal.

34. An optical device according to claim 28, wherein the first and second magnets are a permanent magnet and an electro-magnet, respectively, and the magnetic field varying device includes a variable-current source connected to the electro-magnet.

35. An optical device according to claim 31, wherein the first and second directions are substantially perpendicular to each other.

36. An optical device according to claim 31, wherein the second direction is substantially perpendicular to the input and reflected beams.

37. An optical device according to claim 36, wherein the magneto-optical crystal provides a Faraday-rotation angle substantially equal to 45 degrees to the input and reflected beams when the second magnetic field is set to zero.

38. An optical device according to claim 36, wherein the magneto-optical crystal provides a Faraday-rotation angle substantially greater than 45 degrees to the input and reflected beams when the second magnetic field is set to zero.

39. An optical device according to claim 28, further comprising:

a first optical fiber providing the input beam;

a second optical fiber receiving the reflected beam;

a lens facing ends of the first and second fibers; and a polarizer provided between the lens and the magneto-optical crystal, wherein attenuation of the reflected beam relative to the input beam is changed in accordance with the control signal.

40. An optical device according to claim 39, wherein the polarizer comprises a double-refraction wedge plate splitting the input beam into an ordinary ray and an extraordinary ray propagating in directions different from each other so that the attenuation becomes no longer dependent on a polarization state of the input beam.

41. An optical device according to claim 40, wherein a condition $a/f < \phi$ tan is substantially satisfied, where $\phi$ is an angle formed by the ordinary ray and the extraordinary ray, a is a diameter of a core of the second optical fiber, and f is a focus distance of the lens.

42. An optical device comprising:

a reflector for reflecting an input beam as a reflected beam;

a magneto-optical crystal provided so as to pass said input and reflected beams;

a first means for applying a magnetic field to said magneto-optical crystal; and a second means for varying said magnetic field in accordance with a control signal, wherein said first means comprises a first magnet for applying a first magnetic field to said magneto-optical crystal in a first direction and a second magnet for applying a second magnetic field to said magneto-optical crystal in a second direction different from said first direction, and strengths of said first and second magnetic fields are set at such values that magnetization of said magneto-optical crystal is saturated, said reflector comprises a reflective film provided on said magneto-optical crystal, and said first means includes a magnet and either of N and S poles of said magnet is adhered to said reflective film.

* * * * *